US010494922B2

(12) United States Patent
Wang et al.

(10) Patent No.: US 10,494,922 B2
(45) Date of Patent: Dec. 3, 2019

(54) INTEGRATED APPARATUS FOR PRECISELY AND SYNCHRONOUSLY CONTROLLING AMOUNTS OF DISCHARGED HYDRAULIC OIL AND FLUID USING MOTOR

(71) Applicants: Shaobin Wang, Xi'an (CN); Yongqin Wang, Xi'an (CN)

(72) Inventors: Shaobin Wang, Xi'an (CN); Yongqin Wang, Xi'an (CN)

( * ) Notice: Subject to any disclaimer, the term of this patent is extended or adjusted under 35 U.S.C. 154(b) by 102 days.

(21) Appl. No.: 15/924,296

(22) Filed: Mar. 19, 2018

(65) Prior Publication Data

US 2019/0078437 A1 Mar. 14, 2019

(30) Foreign Application Priority Data

Sep. 8, 2017 (CN) .......................... 2017 1 0803794

(51) Int. Cl.

| | |
|---|---|
| ***E21B 49/08*** | (2006.01) |
| ***F04B 19/22*** | (2006.01) |
| ***F16H 25/20*** | (2006.01) |

(52) U.S. Cl.

CPC ............ *E21B 49/081* (2013.01); *F04B 19/22* (2013.01); *F16H 25/2015* (2013.01); *F16H 2025/2075* (2013.01); *F16H 2025/2087* (2013.01)

(58) Field of Classification Search

CPC ... E21B 49/08-10; E21B 49/081; F04B 19/22

See application file for complete search history.

(56) References Cited

U.S. PATENT DOCUMENTS

2011/0123368 A1* 5/2011 Zazovsky ............... E21B 49/10 417/374

2011/0174091 A1 7/2011 Brinker

FOREIGN PATENT DOCUMENTS

| | | | |
|---|---|---|---|
| CN | 1333459 | A | 1/2002 |
| CN | 1415858 | A | 5/2003 |
| CN | 2677678 | Y | 2/2005 |
| CN | 206360951 | U | 7/2017 |

* cited by examiner

*Primary Examiner* — David J Bagnell
*Assistant Examiner* — Dany E Akakpo
(74) *Attorney, Agent, or Firm* — Gokalp Bayramoglu

(57) ABSTRACT

An integrated apparatus for precisely and synchronously controlling amounts of discharged hydraulic oil and fluid using a motor, includes a housing. A movable dual-piston extractor, a motor and a plunger pump are configured in the housing and sequentially connected. A hydraulic pipeline and a fluid pipeline are connected with the housing to control flows of hydraulic oil and a fluid. A specified amount of fluid sample can be precisely extracted by precisely controlling, according to a control circuit, the number of rotations of the motor, which is indirectly reflected to a travel distance of the lead screw. A motor indirectly drives a lead screw, a nut and a piston to move linearly along a hydraulic chamber through mechanisms including a transmission shaft, and according to a position where the transmission shaft of the motor rotates, the displacement distance of the piston can be measured precisely.

10 Claims, 3 Drawing Sheets

INTEGRATED APPARATUS FOR PRECISELY AND SYNCHRONOUSLY CONTROLLING AMOUNTS OF DISCHARGED HYDRAULIC OIL AND FLUID USING MOTOR

CROSS REFERENCE TO RELATED APPLICATIONS

This application is based upon and claims priority to Chinese Patent Application No. 201710803794.9, filed on Sep. 8, 2017, the entire contents of which are incorporated herein by reference.

TECHNICAL FIELD

The present invention relates to the field of geology, and particularly to an integrated apparatus for precisely extracting a formation fluid sample using an integrated structure of a hydraulic oil piston pump and a mixed fluid piston pump.

BACKGROUND

During the development process of oil, it is needed to take out a fluid in a downhole formation to analyze properties of the fluid and make an oil well exploitation scheme.

At present, a downhole formation fluid extraction apparatus available on the market is in the mode of a hydraulic plunger pump and controls the reciprocation of a hydraulic plunger pump by controlling the reversal of direction of the hydraulic pump using an electromagnetic valve to realize a purpose of extracting a formation fluid. The control over the reciprocation of a plunger pump of this structure depends on an electromagnetic valve which is easily polluted by oil, leading to poor reliability of overall system and relatively high maintenance cost. Besides, it is not easy to control an extraction volume and a discharge volume precisely, resulting in that the amount of a sample acquired is not precise.

SUMMARY OF THE INVENTION

According to some embodiments, an integrated apparatus for precisely and synchronously controlling amounts of discharged hydraulic oil and fluid using a motor comprises a housing, which is a hollow columnar pipe the inside of which is divided sequentially into a fluid chamber, a hydraulic oil chamber, a motor chamber and a plunger chamber; a motor installed at the position of the motor chamber inside the housing and provided at each of two ends thereof with a drive shaft capable of rotating forwards and backwards; a plunger pump positioned in the plunger chamber of the housing and connected with the drive shaft at one end of the motor; a movable dual-piston extractor configured to adjust pressures of the fluid chamber and the hydraulic oil chamber synchronously, positioned at an end of the motor opposite to the plunger pump, and comprising a lead screw connected with the drive shaft at the end of the motor and a piston sleeved on the lead screw, wherein a front end of the piston is a fluid piston and is positioned in the fluid chamber, and a rear end of the piston is a hydraulic piston and is positioned in the hydraulic oil chamber; a fluid pipeline connecting a subterranean fluid with the fluid chamber of the housing and comprising a storage tank for storing a fluid extracted from the fluid chamber and a sample tank for storing a fluid sample; and a hydraulic pipeline separately connected with the hydraulic oil chamber and the plunger chamber in the housing to control the flow of hydraulic oil according to motions of the piston and the plunger pump and comprising an oil tank for storing hydraulic oil and an oil cylinder for driving hydraulic oil.

In an embodiment of the present invention, the lead screw and the drive shaft of the motor are connected by a speed reducer which comprises a planetary speed reducer connected with the drive shaft and a rotation shaft connected with the planetary speed reducer and the lead screw.

In an embodiment of the present invention, the outer diameter of the rotation shaft is pressed into a contact bearing and then placed into an inner hole of a locking seal head together with the contact bearing, one end of the rotation shaft abuts against an output end of the planetary speed reducer, and the other end of the rotation shaft is clamped and limited in the inner hole of the locking seal head.

In an embodiment of the present invention, the inside of the piston is a hollow pipe with an opening end, the lead screw is inserted into the piston from the opening end, a transmission nut matching with the thread of the lead screw is mounted at the position of the opening end, and the lead screw, when rotating, drives, via the transmission nut, the piston to reciprocate in the fluid chamber and the hydraulic oil chamber along the lead screw.

In an embodiment of the present invention, a locking ring for restraining the transmission nut from falling off is mounted at the position of the opening end of the piston.

In an embodiment of the present invention, the fluid piston is an independent component and is fixed on the head of the piston by a lock screw.

In an embodiment of the present invention, the motor is a brushless direct current motor, a motor fixing groove is configured in the housing, and the motor is installed in the motor fixing groove and provided at each of two ends thereof with a locking plug for restraining the motor from rotating in a radial direction.

In an embodiment of the present invention, the fluid chamber and the hydraulic oil chamber are both of an eccentric structure.

In an embodiment of the present invention, two ends of the fluid chamber are both provided with a channel communicating with the fluid pipeline, the storage tank and the sample tank of the fluid pipeline communicate with the two channels respectively through two branch pipes, a one-way valve is configured on each of the branch pipes, and through a combined control over the one-way valves, the fluid piston is caused to suck a formation fluid into the storage tank as a sample when reciprocating.

In an embodiment of the present invention, two ends of the hydraulic oil chamber are both provided with a channel, and the oil tank of the hydraulic pipeline comprises a first, a second and a third oil tanks, and the oil cylinder comprises a first and a second oil cylinders; the first oil tank and the first oil cylinder communicate with the two channels respectively through branch pipes, and the second oil cylinder communicates with the plunger chamber through a branch pipe;

the second and the third oil tanks are connected between the first and the second oil cylinders and controlled by corresponding electromagnetic valves; and a one-way valve is installed on each connecting branch pipe to control the opening/closing of a corresponding branch pipe according to the movement of the hydraulic piston.

In the present invention, the forward rotation and the backward rotation of a motor are realized automatically, and through the cooperation of a lead screw with a piston, a subterranean fluid can be extracted continuously. A specified amount of fluid sample can be precisely extracted by precisely controlling, according to a control circuit, the number of rotations of the motor, which is indirectly reflected to a travel distance of the lead screw. In the present invention, a motor indirectly drives a lead screw, a nut and a piston to move linearly along a hydraulic chamber through mechanisms including a transmission shaft, and according to a position where the transmission shaft of the motor rotates, the displacement distance of the piston can be measured precisely, that is, a specified amount of fluid sample can be acquired precisely.

DETAILED DESCRIPTION OF THE INVENTION

Figure 1:
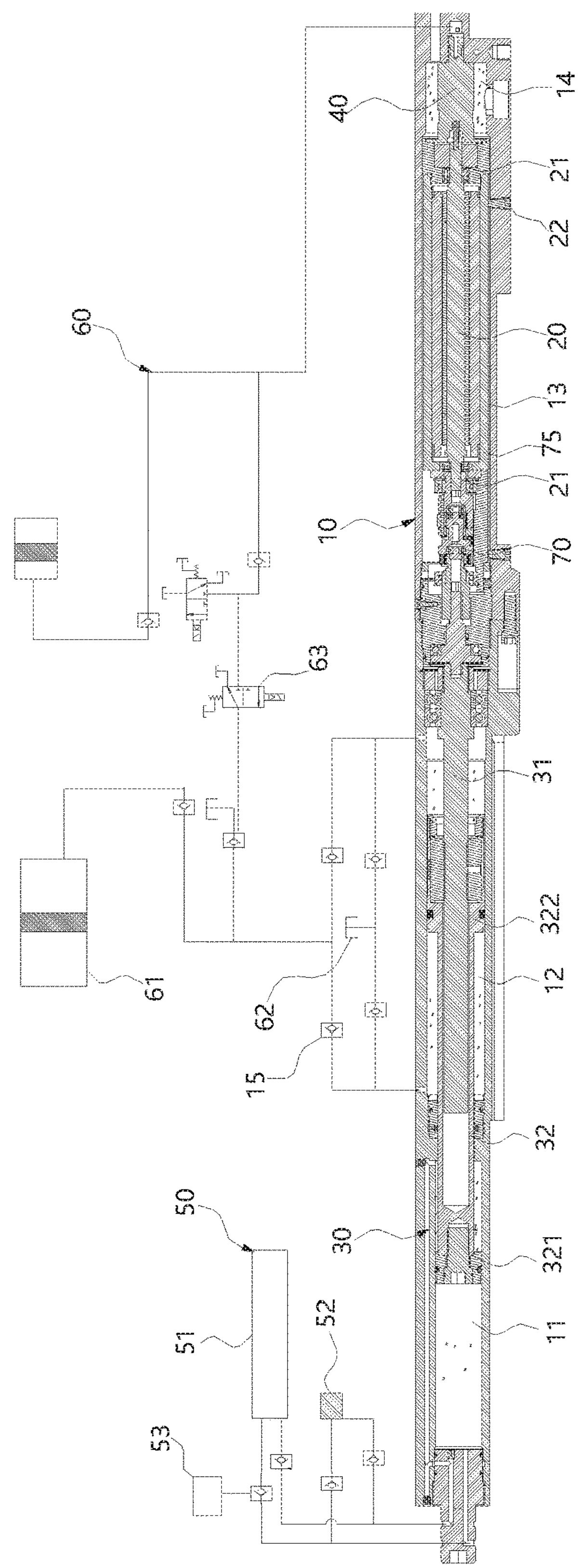
FIG. 1 is a schematic diagram illustrating a structure of an integrated apparatus according to an embodiment of the present invention.
Figure 2:
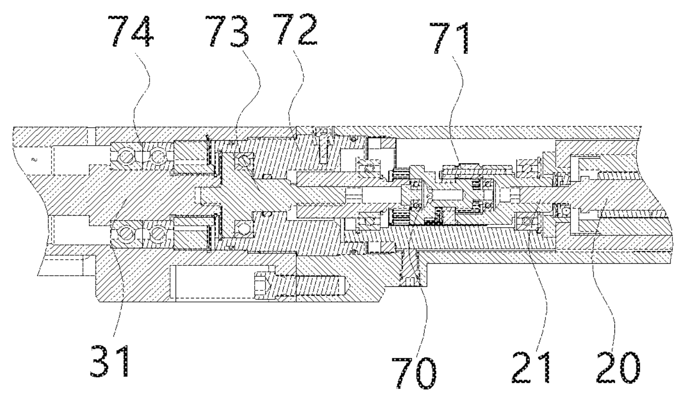
FIG. 2 is a schematic diagram illustrating a structure of a speed reducer shown in FIG. 1.
Figure 3:
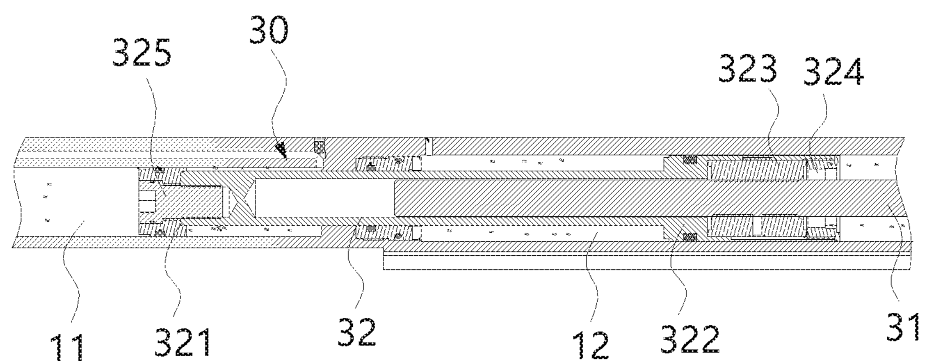
FIG. 3 is a schematic diagram illustrating a structure of a piston shown in FIG. 1.
Figure 4:
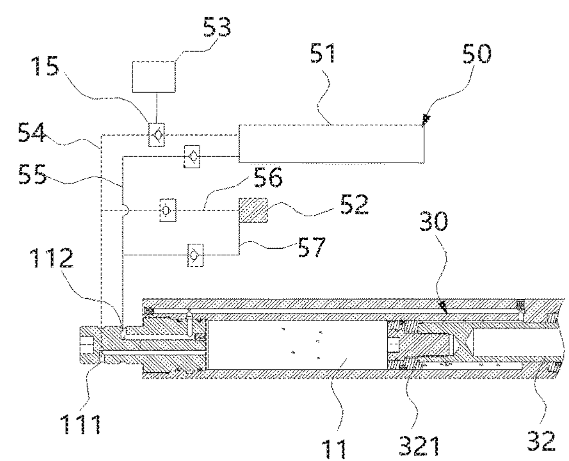
FIG. 4 is a schematic diagram illustrating a structure of a fluid pipeline shown in FIG. 1.
Figure 5:
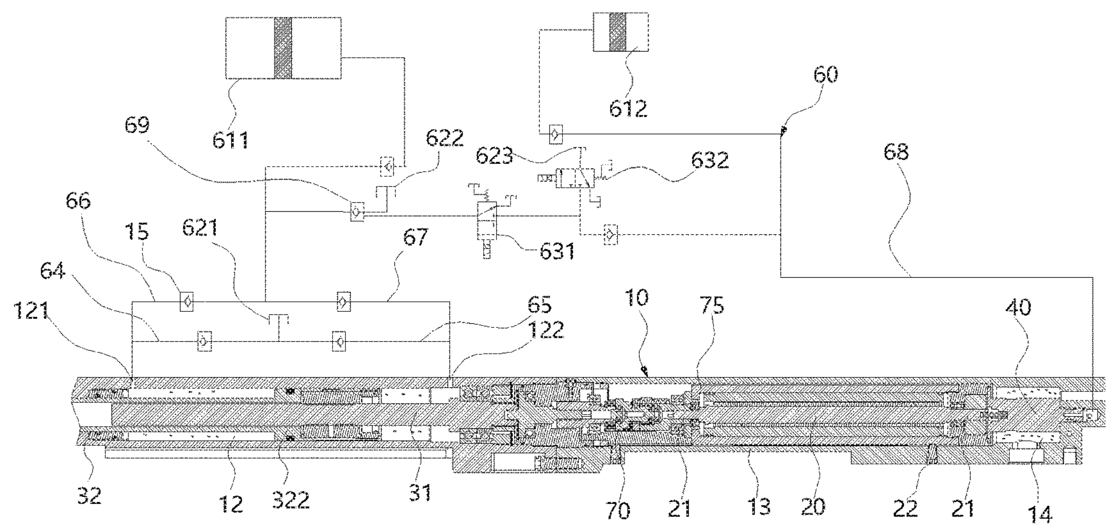
FIG. 5 is a schematic diagram illustrating a structure of a hydraulic pipeline shown in FIG. 1.

As shown in FIG. 1, an integrated apparatus of an embodiment of the present invention generally comprises a housing 10, a motor 20, a plunger pump 40, a movable dual-piston extractor 30, a fluid pipeline 50 and a hydraulic pipeline 60.

The housing 10 is a hollow columnar pipe inside which a fluid chamber 11, a hydraulic oil chamber 12, a motor chamber 13 and a plunger chamber 14 are sequentially configured from a front end to a rear end of the housing, wherein the fluid chamber 11 is used as a space for accommodating an extracted formation fluid, the hydraulic oil chamber 12 and the plunger chamber 14 are filled with injected hydraulic oil, and the motor chamber 13 is used for installing the motor 20.

The motor 20 is installed at the position of the motor chamber 13 in the housing 10, an external stator of the motor 20 is fixed with an inner wall of the housing 10, two ends of a middle rotor of the motor 20 extend out of two ends of the motor to form two drive shafts 21, and the motor 20 can rotate forwards and backwards automatically according to an extraction state of the fluid chamber 11.

The plunger pump 40 is installed in the plunger chamber 14 of the housing 10 and connected with the drive shaft 21 at an end of the motor 20. The plunger pump is specialized for providing a high-pressure oil passage for increasing the pressure in a hydraulic pipe.

The movable dual-piston extractor 30 is positioned at an end of the motor 20 in the housing 20 opposite to the plunger pump 40, and comprises a lead screw 31 connected with the drive shaft 21 at the end of the motor 20 to move linearly and a piston 32 screwed on the lead screw 31 in the form of thread, wherein a front end of the piston 32 is a fluid piston 321 and is positioned in the fluid chamber 11, and a rear end of the piston 32 is a hydraulic piston 322 and is positioned in the hydraulic oil chamber 12.

The fluid pipeline 50 may be divided into two pipelines, one of which has one end connected with a left end of the fluid chamber 11 and the other end connected with a sample tank 53, a storage tank 51 and an inlet for a formation fluid 52, and the other of which has one end connected with a right end of the fluid chamber 11 and the other end connected with the inlet for the formation fluid 52 and the storage tank 51. A one-way valve is installed on each of the two pipelines. The piston, when in motion, injects a fluid sample sucked through the inlet for the formation fluid 52 into the specified sample tank 53 through a pipeline.

One end of the hydraulic pipeline 60 is connected with the plunger chamber 14 and the other end of the hydraulic pipeline 60 is connected with the hydraulic oil chamber 12 so that the motor 20 drives the plunger pump 40 to rotate to input hydraulic oil in the plunger chamber 14 into the hydraulic pipeline 60 in the form of high pressure oil.

The hydraulic pipeline 60 controls the flow of hydraulic oil according to motions of the piston 32 and the plunger pump 40, and comprises an oil tank 62 for storing hydraulic oil and an oil cylinder 61 for driving hydraulic oil. A corresponding one-way valve 15 and a corresponding electromagnetic valve 63 are configured on the fluid pipeline 50 and the hydraulic pipeline 60 to control a flow.

When in operation, the integrated apparatus communicates with the formation fluid 52 through the fluid pipeline 50, and when the motor 20 is in operation, the stator thereof rotates towards the same direction, and the drive shafts 21 at the two ends of the motor 20 synchronously drive the plunger pump 40 and the lead screw 31 to rotate towards the same direction.

After rotating, the plunger pump 40 sucks normal-pressure hydraulic oil in the plunger chamber 14 and then outputs high-pressure hydraulic oil to the hydraulic pipeline 60, the oil tank 62 of the hydraulic pipeline 60 provides hydraulic oil in the plunger chamber 14, and the oil cylinder 61 or the oil tank 62 receives high-pressure hydraulic oil.

The extraction process of the formation fluid 52 will be described below by taking a case as an example in which the piston 32 moves towards a front end of the housing 10 when the motor 20 rotates forwards and moves towards a rear end of the housing 10 when the motor 20 rotates backwards.

When rotating forwards under the drive of the motor 20, the lead screw 31 pushes, by means of the thread thereon, the piston 32 to move linearly, the fluid piston 321 of the piston 32 moves in the fluid chamber 11 to push a fluid ahead to flow into the fluid pipeline 50 and finally flow into the storage tank 51; at this time, the suction generated by the fluid piston 321 in the fluid chamber 11 behind the fluid piston 321 extracts the formation fluid 52 through the fluid pipeline 50 and causes the formation fluid 52 to flow into a rear end of the fluid chamber 11.

The hydraulic piston 322 of the piston 32 synchronously moves towards a left end (that is, the front end of the housing) in the hydraulic oil chamber 12 to push hydraulic oil in the hydraulic oil chamber 12 to flow into the oil cylinder 61 or the oil tank 62 of the hydraulic pipeline 60 and synchronously to suck hydraulic oil in the oil tank 62 of the hydraulic pipeline 60 into a rear end of the hydraulic oil chamber 12 to keep the hydraulic oil chamber 12 always filled with hydraulic oil.

When the lead screw 31 rotates backwards under the drive of the motor 20, the fluid piston 321 is pushed by the thread of the lead screw 31 to move towards the rear end of the fluid chamber 11 to pass through the fluid pipeline and enter the storage tank 51, at the same time, the suction generated by the fluid piston 321 extracts the formation fluid 52 through the fluid pipeline 50 and causes the formation fluid 52 to flow into a space at a front end of the fluid chamber 11. In this case, the hydraulic piston 322 works in the same way in the hydraulic oil chamber 12 as it does when the lead screw 31 rotates forwards, except that hydraulic oil is discharged from the rear end of the hydraulic oil chamber 12 and extracted from a front end of the hydraulic oil chamber 12 in this case.

In the foregoing working process, the forward rotation and the backward rotation of the motor 20 are cyclically alternative, that is, when the piston 32 moves to an end portion at one end, the lead screw cannot move any more, then, the rotation of the transmission shaft of the motor suffers a resistance that rises instantaneously, as a consequence, the motor 20 automatically rotates backwards, causing the piston 32 to move backwards towards the other end, and the forward and backward rotation process may also be controlled by a corresponding control unit, for example, a PC, an industrial personal computer or the like.

When it is needed to acquire a fluid sample, the sample tank 53 can be connected to the fluid pipeline 50, the opening/closing of a corresponding connection pipeline is controlled by a corresponding control switch to cause a fluid to flow into the sample tank 53; after the sample tank 53 is filled, the fluid cannot flow any more, as a consequence, the piston 32 cannot move either, leading to a rise in a resistance value of the motor 20, thus, according to information reflected by the resistance value of the motor, it can be determined that the collection of a sample is completed, and then a control valve located at the position of the sample tank 53 can be closed, and then a pipeline of the storage tank 52 is connected.

In the present invention, the forward rotation and the backward rotation of a motor are realized automatically, and through the cooperation of a lead screw with a piston, a fluid can be extracted continuously. By controlling the working of the motor according to a change in the resistance value of the motor, a specified amount of fluid sample can be acquired precisely. With the use of a motor which drives the plunger pump and the lead screw at two ends thereof respectively to rotate synchronously, a specified amount of fluid sample can be acquired precisely.

In an embodiment of the present invention, to control the speed of movement of the piston 32, the lead screw 31 and the drive shaft 21 of the motor 20 can be connected by a speed reducer 70 which comprises a planetary speed reducer 71 connected with the drive shaft 21 of the motor 20 and a rotation shaft 73 synchronously connected with the planetary speed reducer 71 and the lead screw 31. After being adjusted by the planetary speed reducer 71, rotation power of the motor 20 is transferred to the lead screw 31 through the rotation shaft 73 so that the rotation shaft 73 rotates at the same speed with the lead screw 31.

Further, to prevent hydraulic oil in the hydraulic oil chamber 12 from entering the motor chamber 13, a locking seal head 72 is installed in the housing 10 at the position of the rotation shaft 73 so as to insulate the hydraulic oil chamber 12 and the motor chamber 13 while installing the rotation shaft 73, and the rotation shaft 73 can be restrictedly installed in the locking seal head 72 by an angular contact bearing 74.

An output end of the planetary speed reducer 71 is connected with the rotation shaft 73, the rotation shaft 73 rotates, a rotation seal ring is configured at the position of the rotation shaft 73 to achieve an effect of insulating the hydraulic oil chamber 12 from the motor chamber 13, the rotation shaft 73 is fixed on an inner wall of a hole of the locking seal head 72 through the angular contact bearing 74, and at the same time, a retainer ring is configured to prevent the angular contact bearing 74 from moving axially.

In an embodiment of the present invention, a specific structure of the piston 32 is as follows: the inside of the piston 32 is a hollow pipe with an opening end, the lead screw 31 is inserted into the piston 32 from the opening end, the inner space of the piston 32 is long enough for the piston 32 to reach any position in the hydraulic oil chamber 12 or the fluid chamber 11 when the lead screw 31 rotates forwards or backwards; a transmission nut 323 cooperating with the thread of the lead screw 31 is mounted at the position of the opening end, and when rotating, the lead screw 31 drives, via the transmission nut 323, the piston 32 to reciprocate in the fluid chamber 11 and the hydraulic oil chamber 12 along the lead screw 31.

The piston 32 externally takes the shape of a structure having two convex ends and a concave middle part, diameters of the two ends (that is, the fluid piston 321 and the hydraulic piston 322) of the piston 32 are equal to those of the fluid chamber 11 and the hydraulic oil chamber 12 respectively, while the diameter of the middle part of the piston 32 is equal to that of an insulating through hole which insulates the fluid chamber 11 from the hydraulic oil chamber 12, and when the lead screw 31 rotates, the lead screw 31 drives the transmission nut 323 using the thread on the surface thereof by rotating rather than moving so as to drive the piston 32 to axially move along the lead screw 31.

The transmission nut 323 is installed by being movably clamped into the opening end of the piston 32, and to prevent the transmission nut 323 from falling off, a locking ring 324 is installed at the position of the opening end of the piston 32 to restrain the transmission nut 323 from falling off. In other embodiments, the piston 32 may also be of an inner thread structure which is directly configured on a hollow inner surface to match with the lead screw 31.

Further, to facilitate the installation of the piston 32, the fluid piston 321 may be an independent component which is directly inserted into the front end of the piston 32 via a corresponding clamping structure and fixed on the head of an end of the piston 32 via a locking bolt 325 running through the fluid piston 321.

In an embodiment of the present invention, the motor 20 is a brushless direct current motor, a motor fixing groove 75 is configured in the motor chamber 13 in the housing 10, a stator of the motor 20 is installed in the motor fixing groove 75 in an insertion manner, and then locking plugs 22 for restraining the motor from rotating in a radial direction are configured at two ends of the stator, respectively.

In an embodiment of the present invention, the fluid chamber 11 and the hydraulic oil chamber 12 are both of an eccentric structure which occupies less space and facilitates the arrangement of a pipeline.

In an embodiment of the present invention, a specific structure of the fluid pipeline 50 is as follows: two ends of the fluid chamber 11 are both provided with a channel communicating with the fluid pipeline 50, the storage tank 51 of the fluid pipeline 50 and the formation fluid 52 communicate with the two channels respectively through two branch pipes, and a one-way valve 15 is configured on each of the branch pipes.

After being leaded out from each channel of the fluid chamber 11, a pipeline is divided into two branch pipes so as to be connected with the storage tank 51 and the formation fluid 52, such a structure is adoptable to realize an extraction function and a discharge function at two sides of the fluid piston 321 respectively when the fluid piston 321 moves left and right in the fluid chamber 11. When the fluid piston 321 moves towards a certain direction, a corresponding one-way valve 15 on each branch pipe is opened or closed to control the branch pipe to be in an extraction or discharge state.

For example, when in operation, the fluid piston 321 moves towards the left side of the fluid chamber 11, at this time, a one-way valve on a branch pipe A54 connected with a channel A111 at the left end of the fluid chamber 11 is opened to allow the fluid in the fluid chamber 11 to enter the storage tank 51 sequentially through the channel A111, the branch pipe A54 and the one-way valve. At this time, a channel B112 at the right end of the fluid chamber 11, a branch pipe C57, a one-way valve and the formation fluid 52 communicate with each other to start extracting the fluid into the right end of the fluid chamber 11. Under this condition, one-way valves on branch pipes B55 and D56 are both in a closed state.

When the fluid piston 321 moves towards the right end of the fluid chamber, one-way valves on the branch pipes A54 and C57 are both in a closed state; the channel B112 at the right end of the fluid chamber 11, the branch pipe B55, a one-way valve and the storage tank 51 communicate with each other to allow the fluid at the right end of the fluid chamber 11 to enter the storage tank 51, at the same time, the channel A111 at the left end of the fluid chamber 11, the branch pipe D56, a one-way valve and the formation fluid 52 communicate with each other to allow the fluid to enter the left end of the fluid chamber 11.

In an embodiment of the present invention, a specific structure of the hydraulic pipeline 60 is provided.

Two ends of the hydraulic oil chamber 12 are both provided with a channel communicating with the outside, the hydraulic pipeline 60 has a plurality of oil tanks 62 which may be divided into a first oil tank 621, a second oil tank 622 and a third oil tank 623, and the oil cylinder 61 may be divided into a first oil cylinder 611 and a second cylinder 612; the first oil tank 621 and the first oil cylinder 611 are synchronously communicate with two channels respectively through one branch pipe; the second oil cylinder 612 communicate with the plunger chamber 14 through a branch pipe; the second oil tank 622 and the third oil tank 623 are connected between the first oil cylinder 611 and the second oil cylinder 612 and controlled by corresponding electromagnetic valves 63 respectively; and a one-way valve 15 is installed on each connection branch pipe to control the opening/closing of the corresponding branch pipe according to the direction towards which the hydraulic piston 322 moves.

The working mode of the hydraulic pipeline in operation is described below:

1) when the hydraulic piston 322 moves towards the left end of the hydraulic oil chamber 12:

(1) a channel C121 at the left end of the hydraulic oil chamber 12, branch pipes G66 and E64, a one-way valve, the second oil tank 622 and the first oil cylinder 611 communicate with each other to discharge hydraulic oil to the outside; and a channel D122 at the right end of the hydraulic oil chamber 12, a branch pipe F65, a one-way valve and the first oil tank 621 communicate with each other to suck oil from the first oil tank 621 to circulate hydraulic oil in the first oil tank 621 and the hydraulic oil chamber 12; and (2) the channel C121, the branch pipe G66, a one-way value and the first oil cylinder 611 communicate with each other;

the channel C121, the branch pipe E64, a one-way value and the first oil tank 621 are closed; and the channel D122, the branch pipe F65, a one-way value and the first oil tank 621 communicate with each other;

2) when the hydraulic piston 322 moves towards the right end of the hydraulic oil chamber 12:

(1) the channel D122 at the right end of the hydraulic oil chamber 12, the branch pipe F65, a one-way value and the first oil tank 621 communicate with each other; and the channel C121 at the left end of the hydraulic oil chamber 12, the branch pipe E64, a one-way valve and the first oil tank 621 communicate with each other to circulate hydraulic oil in the first oil tank 621 and the hydraulic oil chamber 12; and (2) the channel D122, a branch pipe H67, a one-way value and the first oil cylinder 611 communicate with each other;

the channel D122, the branch pipe F65, a one-way value and the first oil tank 621 are closed; and the channel C121, the branch pipe E64, a one-way value and the first oil tank 621 communicate with each other; and 3) a channel E of the plunger chamber 14, a branch pipe 168, an electromagnetic valve A631 and the second oil tank 622 communicate with each other; or the channel E of the plunger chamber 14, the branch pipe 168, an electromagnetic valve B632 and the third oil tank 623 communicate with each other; or the channel E of the plunger chamber 14, the branch pipe 168 and the second oil cylinder 612 communicate with each other.

The hydraulic piston reciprocates inside the hydraulic oil chamber to suck hydraulic oil in the first oil tank, compresses hydraulic oil and then outputs hydraulic oil to the branch pipe 168, and the output hydraulic oil can enter the second oil cylinder 612 after passing through a one-way valve.

If the first electromagnetic valve 631 is electrified, then, under the control of a one-way valve, the first electromagnetic valve 631 and a liquid control valve 69, pressure oil of the branch pipe 168 can cause pressurized hydraulic oil discharged by the plunger pump 40 and the piston 32 to communicate with the second oil tank 622 through a fluid control valve 69. When the piston 32 is caused to reciprocate, an end filled with hydraulic oil can be interconnected with returned oil to depressurize, if a second electromagnetic valve 632 is electrified, then high-pressure oil output by the plunger pump 40 directly enters the third oil tank 623 after passing through the branch pipe 168 and the second electromagnetic valve 632. By controlling the first electromagnetic valve 631 and the second electromagnetic valve 632, the power of the brushless direct current motor 20 directly takes effect to drive the piston to reciprocate.

It should be appreciated by those skilled in the art that although a plurality of exemplary embodiments of the present invention have been elaborated and described herein, a variety of other variations or modifications conforming to principles of the present invention can be directly confirmed or devised according to the contents disclosed herein without departing from the spirit and scope of the present invention. Therefore, it should be understood and affirmed that the scope of the present invention covers all such variations or modifications.

What is claimed is:

1. An integrated apparatus for precisely and synchronously controlling amounts of hydraulic oil and fluid to be discharged by using a motor, comprising:

a housing, wherein the housing is a hollow columnar pipe, an inside of the housing is divided sequentially into a fluid chamber, a hydraulic oil chamber, a motor chamber and a plunger chamber;

a motor, wherein the motor is installed at a position of the motor chamber inside the housing, and two ends of the motor are each provided with a drive shaft capable of rotating clockwise and counterclockwise;

a plunger pump, wherein the plunger pump is positioned in the plunger chamber of the housing and connected with the drive shaft at one end of the motor;

a movable dual-piston extractor, wherein the movable dual-piston extractor is configured to adjust pressures of the fluid chamber and the hydraulic oil chamber synchronously and positioned at a first end of the motor opposite to the plunger pump, the movable dual-piston extractor comprises a lead screw connected with the drive shaft located at the first end of the motor and a piston sleeved on the lead screw, a front end of the piston forms a fluid piston and is positioned in the fluid chamber, a rear end of the piston forms a hydraulic piston and is positioned in the hydraulic oil chamber;

a fluid pipeline for connecting a subterranean fluid with the fluid chamber of the housing wherein the fluid pipeline comprises a storage tank for storing a fluid extracted from the fluid chamber and a sample tank for storing a fluid sample; and a hydraulic pipeline separately connected with the hydraulic oil chamber and the plunger chamber in the housing to control a flow of the hydraulic oil according to motions of the piston and the plunger pump wherein the hydraulic pipeline comprises an oil tank for storing the hydraulic oil and an oil cylinder for driving the hydraulic oil.

2. The integrated apparatus for precisely and synchronously controlling amounts of the hydraulic oil and fluid to be discharged by using a motor according to claim 1, wherein the lead screw and the drive shaft of the motor are connected by a speed reducer, the speed reducer comprises a planetary speed reducer connected with the drive shaft and a rotation shaft connected with the planetary speed reducer and the lead screw.

3. The integrated apparatus for precisely and synchronously controlling amounts of the hydraulic oil and fluid to be discharged by using a motor according to claim 2, wherein an outer diameter of the rotation shaft is pressed into a contact bearing and then placed into an inner hole of a locking seal head together with the contact bearing, a first end of the rotation shaft abuts against an output end of the planetary speed reducer, and a second end of the rotation shaft is clamped and limited in the inner hole of the locking seal head.

4. The integrated apparatus for precisely and synchronously controlling amounts of the hydraulic oil and fluid to be discharged by using a motor according to claim 1, wherein a hollow pipe with an opening end is located inside the piston, the lead screw is inserted into the piston from the opening end, a transmission nut matching with a thread of the lead screw is mounted at a position of the opening end, and when the lead screw rotates, the lead screw drives the piston to reciprocate in the fluid chamber and the hydraulic oil chamber along the lead screw via the transmission nut.

5. The integrated apparatus for precisely and synchronously controlling amounts of the hydraulic oil and fluid to be discharged by using a motor according to claim 4, wherein a locking ring for restraining the transmission nut from falling off is mounted at the position of the opening end of the piston.

6. The integrated apparatus for precisely and synchronously controlling amounts of the hydraulic oil and fluid to be discharged by using a motor according to claim 4, wherein the fluid piston is a separated component and is fixed on a head of the piston by a lock screw.

7. The integrated apparatus for precisely and synchronously controlling amounts of the hydraulic oil and fluid to be discharged by using a motor according to claim 1, wherein the motor is a brushless direct current motor, a motor fixing groove is formed in the housing, the motor is installed in the motor fixing groove, and two ends of the motor are each provided with a locking plug for restraining the motor from rotating in a radial direction.

8. The integrated apparatus for precisely and synchronously controlling amounts of the hydraulic oil and fluid to be discharged by using a motor according to claim 1, wherein both the fluid chamber and the hydraulic oil chamber are of an eccentric structure.

9. The integrated apparatus for precisely and synchronously controlling amounts of the hydraulic oil and fluid to be discharged by using a motor according to claim 1, wherein two ends of the fluid chamber are both provided with a first channel communicating with the fluid pipeline, the storage tank and the sample tank of the fluid pipeline communicate with the two first channels respectively through two first branch pipes, a first one-way valve is connected to each of the first branch pipes, and through a combined control over the first one-way valves, the fluid piston is caused to suck a formation fluid into the storage tank as a sample when reciprocating.

10. The integrated apparatus for precisely and synchronously controlling amounts of the hydraulic oil and fluid to be discharged by using a motor according to claim 1, wherein two ends of the hydraulic oil chamber are both provided with a second channel, the oil tank of the hydraulic pipeline comprises a first oil tank, a second oil tank and a third oil tank, the oil cylinder comprises a first oil cylinder and a second oil cylinder;

the first oil tank and the first oil cylinder communicate with the two second channels respectively through second branch pipes, and the second oil cylinder communicates with the plunger chamber through a third branch pipe;

the second and the third oil tanks are connected between the first and the second oil cylinders and controlled by corresponding electromagnetic valves; and a second one-way valve is installed on each connecting branch pipe to control the opening/closing of a corresponding branch pipe according to a movement of the hydraulic piston.

* * * * *